Dec. 6, 1938.   L. J. WILLIAMS   2,139,478
MEASURING MECHANISM
Filed June 23, 1936   2 Sheets-Sheet 1
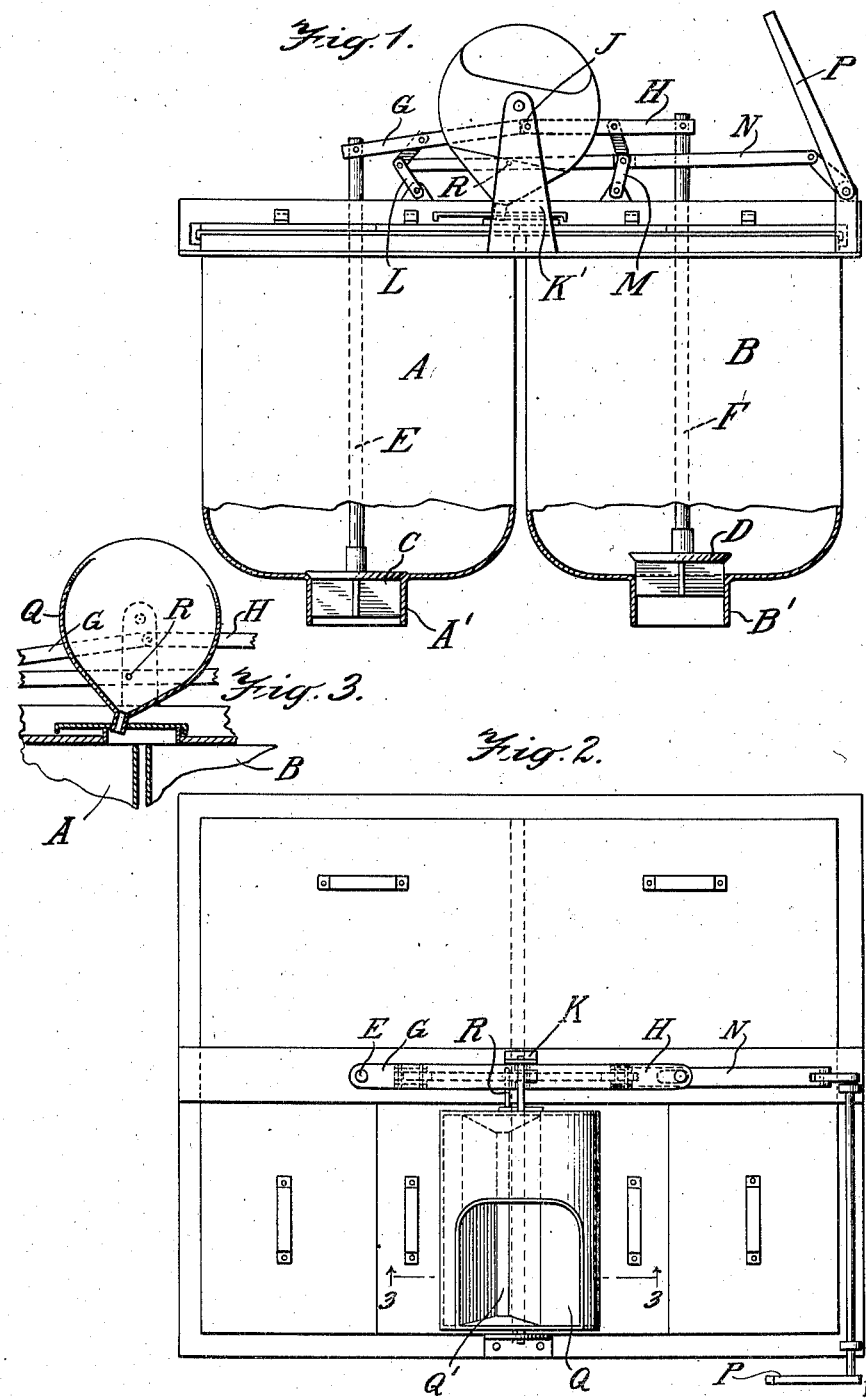

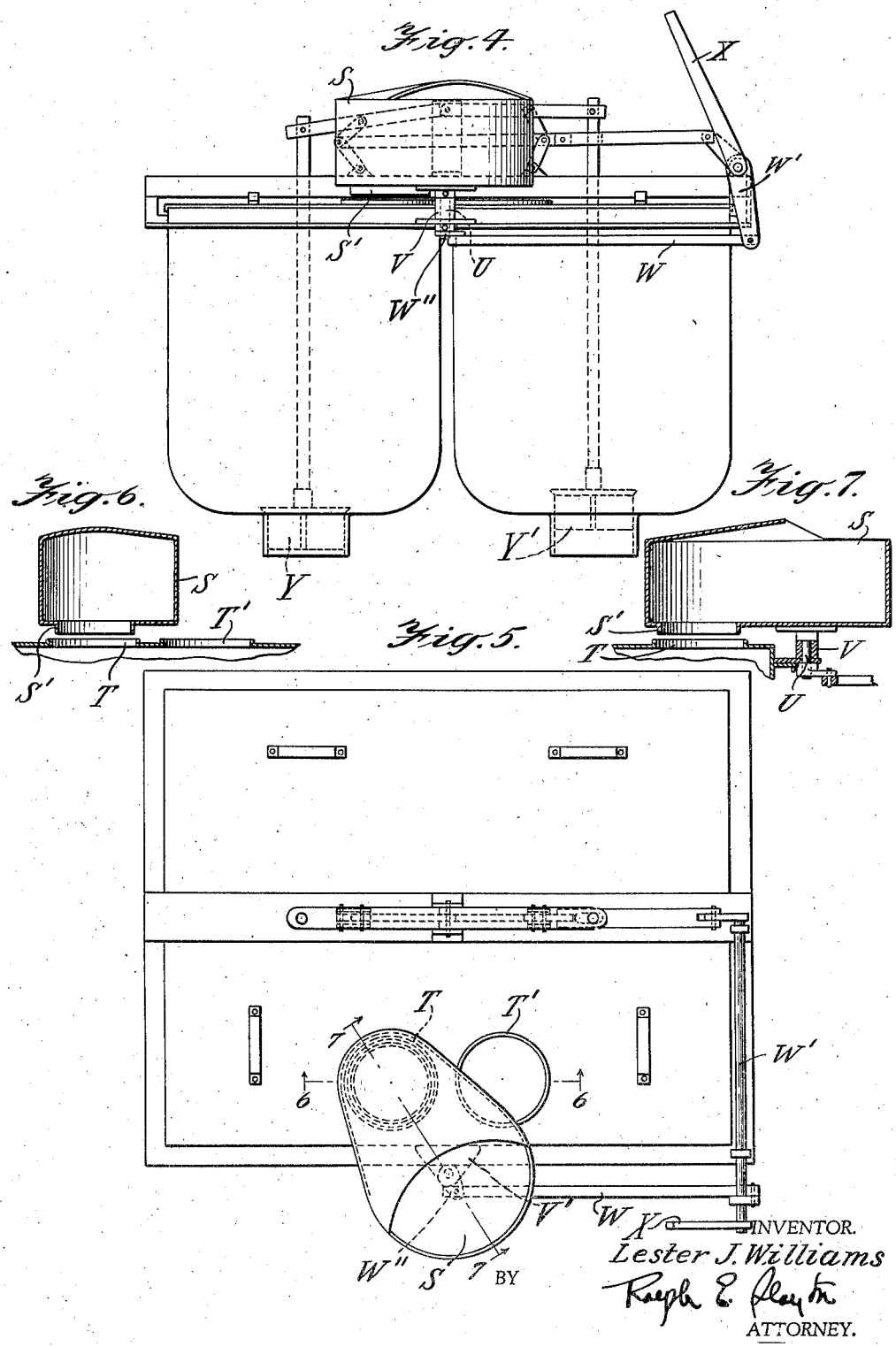

Patented Dec. 6, 1938

2,139,478

UNITED STATES PATENT OFFICE 2,139,478

MEASURING MECHANISM

Lester J. Williams, Canastota, N. Y., assignor to Carl Braun, Inc., Canastota, N. Y., a corporation of New York Application June 23, 1936, Serial No. 86,745

2 Claims. (Cl. 137—21)

This invention relates to devices for measuring fluids, and has more particular reference to devices for receiving, measuring and dumping milk as received from the farmers at the receiving stations of the milk distributors.

One of the principal objects of the invention is to supply a generally simplified device capable of rapid operation so as to expedite the measuring and dumping of the milk.

To accomplish this end a plurality of milk measuring compartments are located within close proximity to each other with a distributing hopper adapted to receive the milk and discharge it to any one of said compartments at will, and to permit any one of these compartments to empty into a collecting chamber while the milk is being discharged from the hopper into one of the other compartments.

Other characteristics and objects of the invention will be apparent as the description proceeds.

While two embodiments of the invention are illustrated in the accompanying drawings, it is to be understood that these embodiments merely serve as illustrations of the underlying principles of the inventions so that they may be readily comprehended by those skilled in the art, and is not intended as limiting the invention to the specific form disclosed therein:

In said drawings:

Fig. 1 is a side elevation of one form of the invention partly in section and partly fragmentary.

Fig. 2 is a top plan view of the form of invention shown in Fig. 1.

Fig. 3 is a section of Fig. 2 on the line 3—3.

Fig. 4 is a side elevation of a modified form of the invention.

Fig. 5 is a top plan view of the form of the invention shown in Fig. 4.

Fig. 6 is a section of Fig. 5 on the line 6—6.

Fig. 7 is a section of Fig. 5 on the line 7—7.

Continuing now by way of a more detailed description and referring more particularly to Figs. 1 to 3 inclusive, measuring receptacles A and B are preferably located within close proximity to each other. Each of these receptacles have cylindrical discharge outlets A' and B' controlled by valves C and D, preferably of the Canadian gate valve type as illustrated. The lower end of the receptacles are rounded with the discharge outlets preferably located at the bottom of the rounded end of the receptacles A and B to facilitate complete discharge to the latter. The valves C and D are controlled by vertically operating plungers E and F connected at their upper ends to links G and H independently pivoted at J on a suitable upstanding bracket K. The bracket K with the bracket K' afford bearings for the supporting of a horizontally disposed hopper to be hereinafter more fully described. Each of the links G and H are independently operated by vertically disposed toggles L and M operated by a laterally moving connecting bar N, linked to a manually operable lever P. By swinging the hand lever P in a clockwise direction, the connecting link N is moved toward the right when viewed as in Fig. 1, thereby operating toggles L and M and raising and lowering the plungers E and F, respectively, controlling the gate valves C and D and permitting the milk contained in the receptacle to be discharged through the outlet controlled by the raised gate valve. A barrel shaped hopper Q adapted to rotate about a horizontal axis has an outlet Q' in the form of an elongated slot to expedite the drainage of the receptacle contents, the latter being adapted to be swung to a position over either one of the receptacles A and B as will be self-evident from an inspection of the construction shown more particularly in Fig. 3. In order to ensure the hopper discharging the milk into the receptacle in which the gate valve is closed, the hopper is connected in any convenient manner as for instance by a rearwardly projecting pin R to the laterally moving link N controlling the toggles L and M so as to ensure simultaneous movement of the hopper with the opening and closing of the valves C and D.

In the modified construction shown in Figs. 4 to 7 inclusive, the hopper instead of rotating about a horizontal axis rotates about a vertical axis and takes the form of a pan shaped container having a milk receiving inlet S with a discharge outlet S' adapted to be swung from side to side so as to register with the openings T and T', in the top of the receiving receptacles. The hopper is conveniently mounted on a base plate U' underlying the hopper and secured thereto in any convenient manner. A vertical shaft U is mounted in a bearing V secured to a bracket V' conveniently secured to one side of the device. In order to swing the hopper outlet S' to register with either the opening T or T' a link W connects the hopper S through a link W'' secured to and projecting laterally from shaft U' with a transverse horizontally disposed shaft W' controlled by a manually operable member X similar to the manually operable member P shown in Figs. 1 to 3 inclusive. The shaft W' is also connected by a link arrangement with the Canadian gate valves Y and Y'. The operation of the handle X by means of the link W swings the hopper outlet S' over the receptacle openings T and T' simultaneously with the operation of the Canadian gate valves and ensures discharge into a receptacle in which the gate valve is closed.

The use of a multiplicity of measuring receptacles permits expeditious handling of the incoming milk for as one receptacle is discharging, the other may be filling thereby affording a substantially continuous operation in receiving, measuring and discharging the milk.

I claim:

1. Apparatus for receiving and discharging fluids, comprising a plurality of receptacles having adjacent inlet orifices, a single apertured slidably mounted cover for said orifices, a rockable hopper adapted to discharge into any one of said receptacles, the discharge end of said hopper, communicating with the aperture of the cover and adapted to slide the latter during rocking motion.

2. Apparatus for receiving and discharging fluids, comprising a plurality of receptacles having adjacent inlet orifices, a single apertured slidably mounted cover for said orifices, a rockable hopper adapted to discharge into any one of said receptacles, the discharge end of said hopper, communicating with the aperture of the cover and adapted to slide the latter during rocking motion, said hopper being of a generally cylindrical form, but tapered in its lower portion to a relatively narrow discharge end.

LESTER J. WILLIAMS.